Dec. 27, 1966    P. R. PITTMAN, JR    3,293,922
SPEED REGULATING DEVICE
Filed May 8, 1963
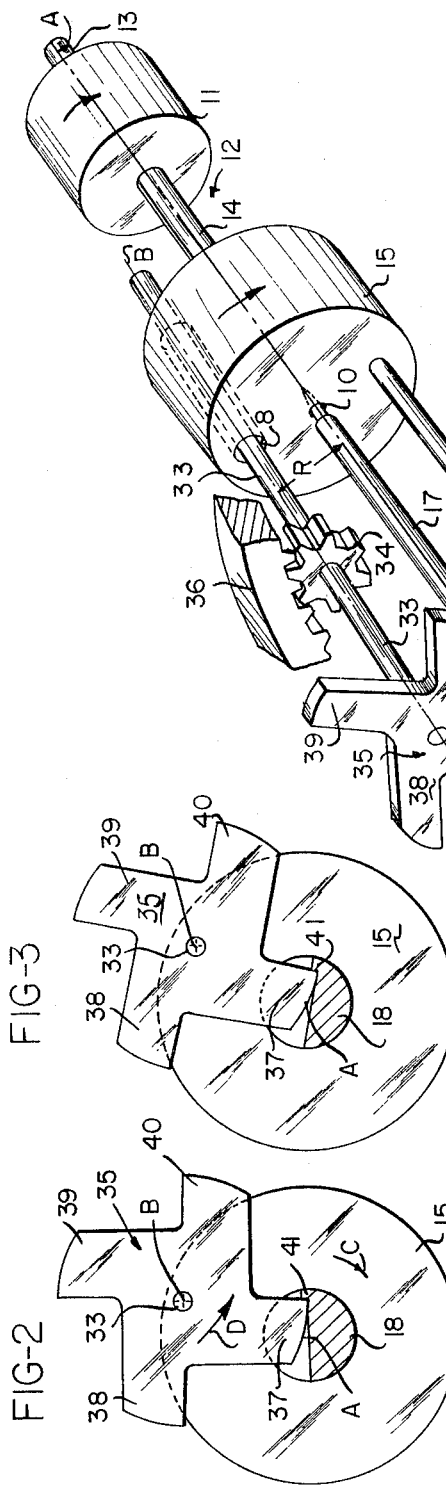
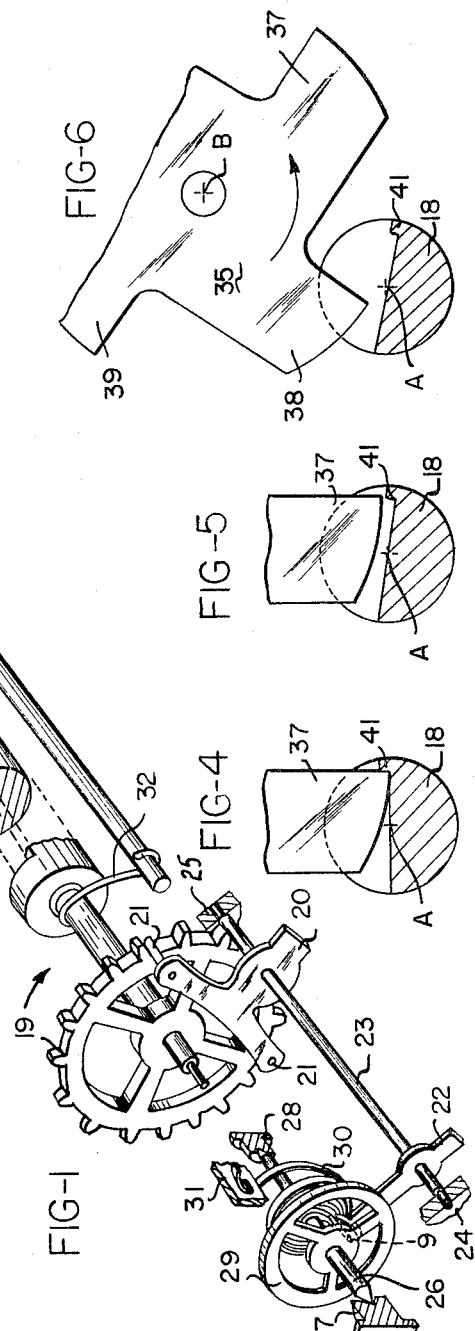
INVENTOR.
PAUL R. PITTMAN JR.
BY
*Milton E. Gilbert*
ATTORNEY

United States Patent Office 3,293,922
Patented Dec. 27, 1966

3,293,922
SPEED REGULATING DEVICE
Paul R. Pittman, Jr., Dayton, Ohio, assignor to Globe Industries, Inc., Dayton, Ohio, a corporation of Ohio
Filed May 8, 1963, Ser. No. 278,888
19 Claims. (Cl. 74—1.5)

This invention relates to speed regulating devices, and is more especially concerned with an angular-velocity regulator of the escapement type, adapted for use with a power source of that class which may be subjected to a stalling torque without injury to the electrical or mechanical components. An example of such a power source is fractional or sub-fractional electric motors now widely used in the aircraft and missile industries. Although further description of the invention will be made with reference to such electric motors, it is to be understood that the invention is applicable to other power sources of the class described.

Constant-speed electric motors are widely used, not only as the driving elements in timepieces but for operating the mechanisms in many forms of controlling and recording devices, where it is important that the angular velocity of a part be maintained constant under a wide variety of variable environmental and other conditions. Principal among such varying conditions are changes in the driving torque due to variations of the supply voltage, and changes in the braking torque due to variations in external loading or internal friction. Where it is feasible to use alternating current as a source of power, one solution to the problem of speed regulation has been the utilization of synchronous motors, wherein the velocity of the apparatus is substantially positively determined by the frequency of the alternating-current supply and its accuracy; and the latter is regulated at the generating station.

While there are many so-called "constant-speed" direct-current motors, the descriptive term is nominal; and the operating velocity is inherently variable under conditions of either changing voltage in the power supply or change in the delivered torque due to variations in the driven load or in frictional losses in the motor itself.

Many efforts have been made to control the speed of small direct-current motors by "chronometric" methods, whereby the electric power is applied to the driving circuits in successive increments of time, the durations of these being based on a comparison of the motor element speed with a standard velocity derived from an escapement mechanism or its equivalent. When such comparison results in an error signal, the latter is employed to control the electric power transmitted to the motor in a well known manner. Such devices have been found to be subject to undue wear due to deterioration of the electrical contacts, and are often unable to respond quickly to sudden variations in the supply voltage or in the driven load. Also inductive interference between the continually broken and restored electrical circuits may give rise to intolerable parasitic and spurious phenomena in adjacent electronic systems.

It has further been suggested to employ a rotating electric commutator of field switching means which sequentially excites opposed pairs of field coils in a motor to permit step by step rotation of a salient pole rotor (e.g., motor shaft). Various means such as escapement devices and eddy current brakes have been employed to control rotation of the commutator in such a device. When applied to a power source having an appreciable torque applied thereto it is readily seen that the shortcomings of the above mentioned chronometric methods are encountered due to the electrical switching action; and furthermore the device is also unable to respond quickly to variations in the driven load.

It is an object of the present invention to provide a speed regulating device especially useful for small motors or other power sources, which device shall be substantially free from speed variation over a wide range of values of the applied driving torque.

It is a further object to provide a speed regulating device of the above nature, which shall be free from speed variation over a wide range of brake or loading torque.

It is a further object to provide a speed regulating device of the nature described, wherein the regulating function is effected without opening, closing or otherwise changing, an electrical circuit and without awaiting the creation of an error signal.

A still further object of the invention is to provide a speed regulating device for a power source which mechanically controls the speed thereof without resort to electrical control circuits.

Another object of the invention is to provide a speed regulating device for a power source which is not dependent for its regulating function upon any modification of the power source structure.

In carrying out the purposes of the invention it is proposed to combine with the power source element to be regulated, an escapement of a conventional type, and to interpose between said power source and escapement a mechanical linkage, whereby the driving force impressed upon the escapement shall be independent of any of the variables for which compensation is to be effected, and wherein the power source element shall be released for advance in increments determined solely by the advance of the escapement and without respect to the magnitude of the torque developed by or derived from said power source element, but within the torque capabilities of the motor.

It is further proposed that said increments bear some fixed relationship to the frequency of increments of the escapement advance, thus providing a "fine" time division, which approaches a substantially constant rate of advance for any mechanism with which the power source device may be operatively associated.

With further regard to the above and to the description following hereinafter, reference may be had to the following drawings, in which:

FIGURE 1 is an exploded perspective view (partially broken away) of one preferred embodiment of a mechanism incorporating the principles of the invention.

FIGURES 2 and 3 are enlarged plan views (partially in cross-section) showing the geometrical relationships of certain component parts of the preferred embodiment of FIGURE 1 under operating conditions.

FIGURES 4, 5 and 6 are further enlarged partial plan views of certain details of the mechanism of FIGURES 2 and 3 in other representative operating positions.

The power source, whose average speed it is desired to regulate to a high degree of accuracy, is shown as a motor 11. While said motor is presumed to be electrically driven, it may be driven by a weight, a spring, or by fluid means without departing from the spirit of the invention. Since the motor per se forms no part of the invention it is only shown schematically. The rotor or moving element, of the motor (not shown) may be blocked or stalled by applying a braking torque in excess of the torque normally developed in the motor, without harming the motor.

The motor 11 is provided with an output shaft 12 rotatable about a principal axis A, with one side of the shaft 13 being available to drive a load. The opposite side 14 of the shaft 12 is adapted to drive certain components of the speed-regulating means now to be described.

Integrally attached to the shaft 14 and rotatable therewith about the axis A is a block or "face plate" 15 having mounted thereon an offset crack member 16 extended preferably parallel to the axis A. A shaft or spindle member 17, pivotally engages the face-plate 15, and freely rotates with respect thereto about the axis A, in a blind bore 10. The shaft 17 carries a detent member 18 (presently to be described in further detail) and also a toothed escapement wheel 19.

The escapement wheel 19 forms a component of an escapement system comprising also an anchor member 20 having pins or pallets 21 adapted to cooperate with the teeth of the escapement wheel in intermittently locking the same against continuous rotation. A lever member 22 is fixed together with said anchor member 20 to a shaft or spindle 23 which in turn is adapted for rotary movement in stationary bearings 24 and 25. A staff or arbor 26, pivotally mounted in stationary bearings 27–28 (which may be jewel bearings), carries a balance wheel 29 affixed thereto and adapted for oscillatory motion with said staff 26 in the bearings 27–28. Oscillation of the balance wheel 29 is limited and regulated by means of an elastic hairspring 30 having one extremity attached to the staff 26 and the other extremity secured to a stationary abutment 31. Operative engagement between the lever 22 and the balance wheel 29 is provided by a fork 9 on the lever 22 and a pin (not shown) on the balanced wheel 29, as is customary in high grade watches and chronometers. The whole combination of escapement wheel 19 and parts driven thereby comprises a conventional escapement, for which no invention is herein claimed per se.

Extended between the crank member 16 and the shaft 17 is an elastic spring member 32, whereby, as the crank member 16 is caused to revolve with the face-plate 15 about the axis A of the mechanism, a driving torque will be imparted to the shaft 17 through the spring 32, causing the shaft 17 to tend to rotate in the same sense as the face-plate 15. When such torque is communicated to the escapement mechanism, the escapement wheel 19 and associated parts will operate in the conventional manner, and the shaft 17 will rotate intermittently and at an average speed determined by the mechanical characteristics of the escapement.

The operation of the escapement to permit the rotation of escapement wheel 19 is restrained by an intermittent locking means. One preferred embodiment of such intermittent positive locking means is shown in FIGURE 1. Journaled at 8 in the face-plate 15 for free rotation about an axis B parallel to the principal axis A but removed therefrom by a radius R is a shaft 33 having fixed thereto a pinion 34 and a star wheel 35. The pinion 34 meshes with a stationary internal gear 36, thereby constituting an epicyclic train. Thus, as the shaft 33 revolves at the radius R about the axis A it will also rotate about its own axis B, so that points located on the pitch line of the pinion 34 will follow cycloidal paths as the resultant of the rotation of said pinion about the axis B and its revolution about the axis A. The star-wheel 35 is provided with salient projections or teeth 37, 38, 39 and 40, uniformly distributed about its periphery and each having a radial face as indicated. Said teeth are so dimensioned and proportioned that as the star-wheel 35 rotates about the axis B the tip of each tooth will substantially intersect the axis A. The detent member 18 comprises a block having a semi-cylindrical portion, and provided with a lip or catch 41 lying substantially on a diameter of the member 18 and passing through the axis A. This lip 41 is adapted for engagement by one of the teeth of the star-wheel 35 to provide a positive obstruction to its rotation. The engaging surface of the lip 41 is so conformed and disposed that, when engaged by one of the teeth of the star-wheel 35, said surface coincides with a radius of the star-wheel, so that pressure of said tooth on said lip will have no tendency to rotate the shaft 17 about the axis A.

Operation of the device will be understood by reference to FIGURE 1, taken in conjunction with the enlarged geometrical representations shown in FIGURES 2–6, inclusive. Referring, first, to FIGURE 1, it may be assumed that the motor 11 has been energized and is developing torque in a clockwise sense as shown by the arrow in FIGURE 1. This will tend to rotate the face plate 15, carrying the crank member 16 and the shaft 33 in that sense bodily about the axis A at their respective radii therefrom. The pinion 34, meshing with the stationary internal gear 36, will tend to cause the shaft 33 and the star-wheel 35 to rotate in a counterclockwise sense about the axis B. If this motion were unobstructed the mechanism would rotate freely, the tip of each of the teeth 37, 38, 39 and 40 following a hypotrochoidal path in its progress. At the same time, rotation of the crank member 16 about the axis A would tend to wind the spring 32 around the shaft 17 in a sense to drive the escapement mechanism.

With the detent member 18 and the star-wheel 35 relatively positioned as indicated in FIGURES 1 and 2, it will be seen, however, that the lip 41, lying in the path of the tooth 37, provides a definite obstruction to rotation of the star-wheel, thus positively locking the mechanism against rotation of the plate 15 and thereby stalling the moving element of the motor against rotation.

Assuming that the above-described locked condition has been attained only after the crank member 16 has made sufficient angular travel to exert a definite winding action upon the spring 32, the shaft 17, and with it the detent member 18 and the escapement wheel 19, will tend to rotate in a clockwise sense as seen in FIGURE 1, and that such rotation will take place in increments as determined by the escapement.

Reference may now be had to FIGURES 2 and 4, wherein is shown the relative position of the coacting portions of the detent member 18 and the star-wheel 35 corresponding to the "locked" condition as hereinabove described, the rotative tendencies of the same being indicated by the respective arrows C and D. As the escapement wheel 19 advances under the torque of the spring 32, the detent member 18 rotates through a like angle, and, as indicated in FIGURE 5, the lip or catch 41 will be withdrawn from engagement with the tooth 37, freeing the latter and allowing the star-wheel to rotate (as indicated in FIGURE 6). The face-plate 15, together with the rotating element of the motor 11 then advances in a clockwise sense. If the tips of the teeth of the star-wheel 35 were to follow circular paths with respect to the detent member 18, there would be no re-engagement, and the star-wheel and associated parts would continue to rotate freely. However, because of the clockwise advance of the axis B with the face-plate 15, causing the tips of the teeth each to follow a hypotrochoidal path, the tooth 38, as it follows the tooth 37, will find its path obstructed by the lip 41, and the mechanism will again be brought to rest. Meanwhile, however, the crank member 16, by its clockwise advance, will have imparted additional energy to the spring 32, tending further to rotate the shaft 17, the detent 18, and the escapement wheel 19, as permitted by the escapement.

Thus, for each beat of the balance-wheel 29, the rotating element of the motor 11 is alternately locked and released for rotation through a definite increment. The engaging surfaces of the teeth on the star-wheel 35 and the lip 41 of the detent member 18 is conformed for mutual engagement, and as hereinbefore described, there will be no energy transfer through this part of the linkage and the driving torque applied to the escapement wheel will be constant as determined by the periodic and uniform advances of the crank member 16 imparting equal increments of energy to the drive-spring 32.

The performance described in the foregoing paragraphs will be repeated indefinitely, and the shaft 14, the driving element of the motor 11, and the output shaft 12 will rotate in small increments at an average speed determined by that of the escapement wheel 19, subject to the regulating action of the escapement of which it forms a part. It will be seen that the pressure between the engaging tooth of the star-wheel 35 and the lip 41 of the detent member 18 will be proportional to the difference between the torque developed in the motor 11 and the brake or load torque. Since there is no transfer of energy between the star-wheel 35 and the shaft 17, there will be no tendency for driving or load conditions to affect the operation of the escapement or the average speed of rotation.

What I claim is:

1. A speed regulating device for a power source having an output member, comprising, in combination:
    escapement means including an escapement wheel and having a predetermined frequency of escapement wheel rotation,
        said escapement means being so constructed and arranged as to successively permit and prevent rotation of said escapement wheel;
    locking means interconnected to be intermittently actuated by said output member and a portion of said locking means being moved by said escapement wheel to alternately prevent and permit motion of said output member in a fixed relationship to the predetermined frequency of escapement wheel rotation;
    resettable loading means for powering said escapement wheel;
        said loading means being interconnected to be intermittently actuated by said power source;
    whereby, when said locking means is released, said power source is permitted to reset said loading means.

2. The speed regulating device of claim 1, wherein said locking means includes a detent member and a driven member having detent engaging means;
    said detent member being affixed to be moved coordinately with said escapement wheel; and
    said power source being arranged to actuate said driven member to bring said detent engaging means into locking engagement with said detent member.

3. The speed regulating device of claim 2, wherein said loading means comprises a flexible member arranged to be flexed by said power source, one portion of said flexible member being so connected with respect to said detent member and escapement wheel as to periodically apply loading force thereto upon said flexible member being flexed by said power source.

4. The speed regulating device of claim 1, wherein said loading means comprises a flexible member arranged to be flexed by said power source and to apply such flexion to said escapement wheel.

5. An intermittent locking means for use with an escapement means and arranged to be operated by a power source, said locking means comprising, in combination:
    a detent member;
    a driven member having detent engaging means so located as to intermittently engage said detent member,
        said power source when activated being interconnected to constantly impress a loading force upon said drriven member,
    said detent member being affixed to be moved coordinately with a portion of said escapement means;
    and means for intermittently impressing a releasing force upon said detent member at a time determined by the movement of said portion of said escapement means;
    whereby when said driven member is moved into detent engaging position with said detent member by said power source, said power source is momentarily locked out of operation and thereafter is momentarily permitted to transmit power.

6. The intermittent locking means of claim 5, wherein said means for imposing a releasing force is a flexible member having a portion thereof affixed to said detent member, and wherein said power source is further interconnected to apply flexion to said flexible member whereby to load said detent member.

7. The intermittent locking means of claim 6, wherein said escapement means includes an escapement wheel affixed to be coordinately moved with said detent member, said flexible member being arranged to simultaneously load both said detent member and said escapement wheel, whereby when said escapement means operates to move said detent member, said locking means is thereby unlocked to permit operation of said power source.

8. The intermittent locking means of claim 5 wherein said driven member comprises a wheel-like element having radially disposed latching surfaces; and said detent member includes a surface portion so disposed with respect to said latching surfaces as to substantially prevent energy transfer which would impart motion to said detent member while simultaneously inhibiting motion of said wheel-like element.

9. The inermittent locking means of claim 8, wherein said means for imposing a releasing force is a flexible member having a portion thereof affixed to said detent member, and wherein said power source is further interconnected to apply flexion to said flexible member whereby to to load said detent member.

10. The intermittent locking means of claim 9, wherein said escapement means includes an escapement wheel mounted for rotation with said detent member, said flexible member being arranged to simultaneously load both said detent member and said escapement wheel, whereby when said escapement means operates to move said detent member, said locking means is thereby unlocked to permit operation of said power source.

11. A speed regulating device for a motor having an output shaft, comprising, in combination:
    escapement means including an escapement wheel and having a predetermined frequency of escapement wheel rotation,
        said escapement means being so constructed and arranged as to successively permit and prevent rotation of said escapement wheel;
    said output shaft having an output member mounted thereon,
    locking means having a portion thereof mounted so as to be moved by the output member of said motor, another portion of said locking means cooperating with said escapement wheel to alternately prevent and permit motion of said output member in a fixed relationship to the predetermined frequency of escapement wheel rotation;
    resettable loading means for powering said escapement wheel,
        said loading means being driven from said output shaft,
    whereby, when said locking means is released, said motor is permitted to drive the output shaft in such manner as to reset said loading means.

12. The speed regulating device of claim 11, wherein said escapement wheel is mounted on a spindle,
    said locking means includes a detent member and a driven member having detent engaging means;
    said detent member being affixed to said spindle; and
    said output shaft being arranged to actuate said driven member to bring said detent engaging means into locking engagement with said detent member.

13. The speed regulating device of claim 12 wherein said loading means comprises a resilient power transmitting member attached at one end to the spindle and at its other end to said output shaft, whereby upon rotation of said output shaft energy is stored in said resilient member to apply a torque upon said spindle.

14. An intermittent locking means for use with an escapement means having an escapement wheel and arranged to be operated by the output shaft of an electric motor, said locking means comprising, in combination:
   a detent member;
   a driven member having detent engaging means adapted to intermittently engage said detent member, said output shaft being interconnected to cause rotation of driven member,
   said detent member being affixed to rotate coordinately with said escapement wheel;
   whereby when said driven member is moved into detent engaging position with said detent member by said electric motor, said motor is momentarily locked out of operation.

15. The intermittent locking means of claim 14 in combination with a resilient power transmitting member attached at one end to the detent member and at its other end to said output shaft, whereby upon rotation of said output shaft energy is stored in said resilient member to apply a torque upon said detent member.

16. The intermittent locking means of claim 15, wherein said detent member is mounted on a spindle; said escapement means including an escapement wheel affixed to said spindle and pallet means for periodically releasing and holding said escapement wheel; said resilient power transmitting member being attached to said spindle, whereby when said pallet means operates to release said escapement wheel the torque stored in said resilient member causes rotation of said spindle to release said locking means and permit further rotation of said output shaft.

17. The intermittent locking means of claim 14 wherein said driven member comprises a wheel-like element having radially disposed latching surfaces; and said detent member includes a surface portion so disposed with respect to said latching surfaces as to substantially prevent energy transfer to impart motion to said detent member while simultaneously inhibiting motion of said wheel-like element.

18. The intermittent locking means of claim 17, in combination with a resilient power transmitting member attached at one end to the detent member and at its other end to said output shaft, whereby upon rotation of said output shaft energy is stored in said resilient member to apply a torque upon said detent member.

19. The intermittent locking means of claim 18, wherein said detent member is mounted on a spindle; said escapement means including an escapement wheel affixed to said spindle and pallet means for periodically releasing and holding said escapement wheel; said resilient power transmitting member being attached to said spindle, whereby when said pallet means operates to release said escapement wheel the torque stored in said resilient member causes rotation of said spindle to release said locking means and permit further rotation of said output shaft.

References Cited by the Examiner
UNITED STATES PATENTS

| | | | |
|---|---|---|---|
| 1,286,090 | 11/1918 | Phelps et al. | 74—1.5 |
| 1,301,968 | 4/1919 | Pederson | 74—1.5 |
| 2,256,600 | 9/1941 | Van Slyke | 58—117 X |
| 2,694,287 | 11/1954 | McGay et al. | 58—116 X |
| 2,968,186 | 1/1961 | Jeanneret | 58—116 X |
| 2,970,427 | 2/1961 | Douglass | 58—117 |
| 3,103,121 | 9/1963 | Anderson et al. | 74—1.5 |
| 3,125,890 | 3/1964 | Dillon et al. | 74—1.5 X |

FRED C. MATTERN, JR., *Primary Examined.*

BROUGHTON G. DURHAM, *Examiner.*

D. H. THIEL, *Assistant Examiner.*